No. 703,899. Patented July 1, 1902.
E. DEBES.
BALL AND SOCKET JOINT FOR DOLLS OR THE LIKE.
(Application filed Dec. 19, 1901.)
(No Model.)
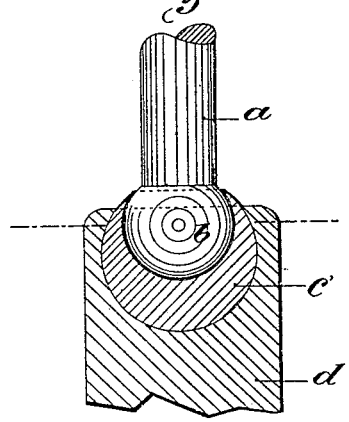
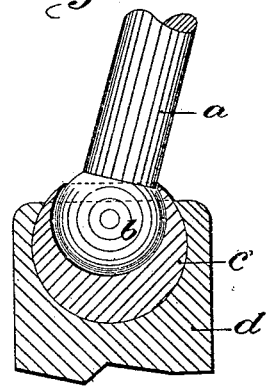
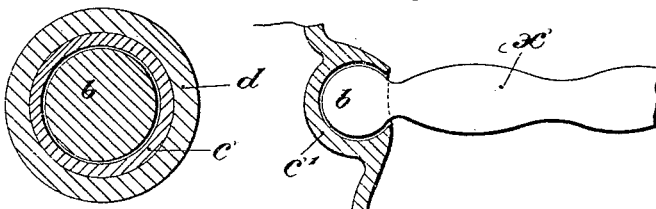
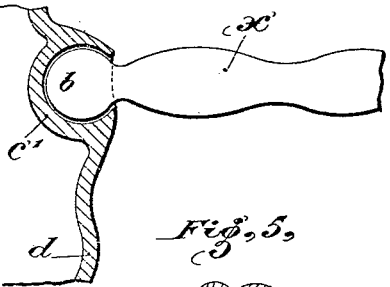
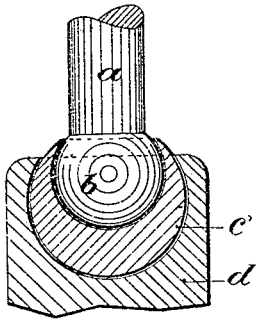
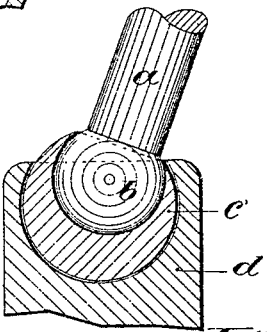
Witnesses:
Inventor
Eduard Debes
By James L. Norris
Atty EDUARD DEBES, OF HAMBURG, GERMANY, ASSIGNOR TO HEINRICH OTTO REES, OF MUNICH, GERMANY.

BALL-AND-SOCKET JOINT FOR DOLLS OR THE LIKE.

SPECIFICATION forming part of Letters Patent No. 703,899, dated July 1, 1902.

Application filed December 19, 1901. Serial No. 86,561. (No model.)

*To all whom it may concern:*

Be it known that I, EDUARD DEBES, manager, a subject of the King of Prussia, German Emperor, residing at Blankenese, near Hamburg, Germany, have invented certain new and useful Improvements in Ball-and-Socket Joints for Dolls or the Like, of which the following is a specification.

My invention relates to a ball-and-socket joint intended for dolls and the like and which is novel and original, owing to the fact that the actual ball attached to a joint or limb, and which may consist of any suitable material, is inserted in a spherical socket made of an elastic material, such as rubber, and which surrounds the ball either loosely or immovably to the extent of about three-fourths of its entire periphery, this elastic intermediate socket being inserted either loosely or immovably (as the case may be) by simple pressure into the spherically-hollowed solid second part of the joint for the purpose of joining the two articulated parts with each other, so that they are readily movable, while at the same time obviating as far as possible an unintentional or premature separation of the parts, such as would easily happen with the doll-joints hitherto known, and also affording the possibility of readily joining the ball-and-socket joint and taking it to pieces again. The intermediate spherical socket is crescent-shaped in its section along the center line of the articulated parts—that is to say, it has its minimum thickness at its outer exposed circular aperture and its maximum thickness at the remotest opposite part or bottom, and consequently the articulated part or limb, with the ball, can be forced by a slight pressure into the elastic intermediate socket, which, together with the ball contained in it, can then be introduced with equal ease into the spherical cavity of the other part. By a smart pull the articulated part, together with the ball, can be withdrawn from the intermediate socket. Similarly the latter, owing to its elasticity, can be easily removed from the cavity of the other part.

In the accompanying drawings, Figure 1 is a longitudinal section. Fig. 2 is a cross-section. Fig. 3 is a longitudinal section showing the movable articulated part in a different position from that which it occupies in Fig. 1. Figs. 4 and 5 are longitudinal sections showing the intermediate socket as movable in the spherical cavity and the ball immovably secured to the intermediate socket. Fig. 6 is a cross-section of a modification in which the spherical socket is made of india-rubber, the intermediate socket being dispensed with.

In Figs. 1 and 2 the intermediate elastic socket $c$ is supposed to be fixed in the spherical cavity of part $d$, while the ball $b$ of the articulated part $a$ is supposed to revolve in the intermediate socket $c$, as in Fig. 3. In Figs. 4 and 5 I have shown the intermediate socket $c$ movable in the spherical cavity of part $d$, while the ball $b$ is immovably fixed in the intermediate socket $c$. Of course the arrangement may also be made so that all the parts are movable or free to revolve within each other. I may add that the same purpose may also be attained, while dispensing with the intermediate socket $c$, by making either the ball or its seat in one or the other of the articulated parts $a$ and $d$ of elastic material—say, for instance, india-rubber. It is also possible, for instance, to make the whole trunk of the doll or the ball-socket $c'$ only of india-rubber, while the articulated limb $x$ or the ball $b$, attached to it, only is made of a hard material. On the other hand, the ball $b$ may consist of india-rubber, while its socket or the trunk of the doll is made of hard material—that is to say, the intermediate socket $c$, according to Figs. 1 to 5, is only employed if the two articulated parts $a$ and $d$ or the trunk and limbs of the doll are both made of the hard material, such as celluloid or papier-mâché or the like.

Having now particularly described and ascertained the nature of my said invention and in what manner the same is to be performed, I declare that what I claim is—

1. A ball-and-socket joint for dolls and the like, consisting of an articulated part having a spherical cavity and an intermediate elastic socket seated in said spherical cavity, the latter adapted to receive the ball of another articulated part.

2. In a ball-and-socket joint for dolls and the like, an articulated part having a spherical cavity and an intermediate socket of elastic material to permit the ball of the other articulated part to be forced into the spherical cavity of the intermediate socket.

3. In a ball-and-socket joint for dolls and the like, an articulated part having a spherical cavity, a ball on another articulated part, and an elastic covering for said ball to permit the latter to be forced into and out of said spherical cavity.

In testimony whereof I have hereunto set my hand in presence of two subscribing witnesses.

EDUARD DEBES.

Witnesses:
 OTTO W. HELLMRICH,
 T. CHRIST. HAFERMANN.